Oct. 17, 1967   L. PETERS   3,347,158
PRESS APPARATUS
Filed Dec. 29, 1965   2 Sheets-Sheet 1

Inventor:
Leonhard Peters
By Nolte & Nolte
Attorneys

United States Patent Office 3,347,158
Patented Oct. 17, 1967

3,347,158
PRESS APPARATUS
Leonhard Peters, Schwabisch Gmund, Germany, assignor to May-Pressenbau GmbH, Schwabisch Gmund, Germany
Filed Dec. 29, 1965, Ser. No 517,243
Claims priority, application Germany, Sept. 4, 1965, M 66,532
9 Claims. (Cl. 100—269)

ABSTRACT OF THE DISCLOSURE

In a plunger of mechanical presses, a damping device comprising a cushion disposed in a high pressure chamber, which is located between a main portion of the plunger and the plunger pressure piece, a pressure transmitting piston extending into the high pressure chamber and movably arranged in the main portion of the plunger, while a counter pressure piston is fixedly mounted on the pressure transmitting piston and is guided in a low pressure chamber which communicates with a compressed air chamber.

---

The invention relates generally to a damping arrangement, and more particularly to a clamping device for a plunger of mechanical presses. It is known, since a long period of time to provide a damping device, particularly on crank, or eccentric presses in order to let the pressure which is exerted by the plunger, after contacting the work piece, slowly increase to a maximum, whereby the tool, particularly the press will be protected. In order to achieve such a mode of operation, a cushion is used which is formed by a liquid and is provided between a main portion of the plunger and a pressure piece of the press plunger onto which the pressure of the press is effective.

Furthermore, it is known to form the damping device for the press plungers in such a way that the press may be operated under different operating conditions, that is, with variable working pressure.

Different methods were already attempted to form variable working conditions in such damping devices. In a known construction, two chambers which are provided in the main portion of the plunger are connected with each other by means of a passage. A desired increase of pressure is brought about by a control pin which is carried by the pressure piece, slowly closing the passage opening during the movement of the pressure piece until the communication between both chambers is interrupted and the maximum pressure of the press is attained. By means of an adjustable, for instance, a cone shaped arresting member, the initial cross section of the passage may be brought to a defined size, so that any desired increase in the pressure may be attained in a variable fashion. During operation of the press, that is, during the operation stroke of the plunger, heat will be released, due to the resistance created by the control member, which circumstance brings about a change in the operating conditions. The adjustment of the control member for providing optimum operating conditions is, therefore, rather difficult and complicated, so that the operator who makes the adjustment, must be very experienced.

In a further known damping device, according to the German Patent No. 409,075, such difficulties are allegedly not present. In this construction, a pressure transmitter is used, the high pressure chamber of which is filled with a liquid and communicates with a liquid cushion provided between the plunger pressure piece and the main portion of the plunger, while a low pressure chamber which is filled with air communicates with a compressed air chamber. In this construction, the liquid, which forms the cushion, is additionally used for actuating a piston of the pressure transmitter wherein the air is compressed, for damping purposes, on the low pressure side thereof, so that the damping itself is performed exclusively by a gas-like medium. Thereby, a complete separation between the chambers which contain the liquid and the gas, is provided, so that forming of foam in the liquid chamber is made impossible. Thereby, an adjustment of the operating pressure in the gas chamber, which is connected to the low pressure side, is simply effected by reducing or enlarging the volume of the gas chamber, and thus changing the effective maximum pressure. In this construction, which may be considered as a prior art with respect to the subject invention, the pressure transmitter, as well as the container forming the gas chamber which is connected thereto require too much space as individual units, which have to be installed on the side next to the press independent from the plunger, so that too much space is needed for installing such presses.

However, a substantial shortcoming in accordance with such a construction is based upon the fact that the gas-like medium which is pre-tensioned in the gas chamber during the lowering of the press plunger, remains completely active in each phase of the plunger movement, so that during the upward movement thereof, the pressure piece is removed from the work piece in a generally delayed manner.

It is, therefore, an object of the invention, to provide an improved damping device which may be accommodated in the press plunger and which is free of delay during the return movement of the pressure piece.

This object will be achieved according to the invention, in that the cushion is disposed in the high pressure chamber of the pressure transmitter, which is located between the main portion of the plunger and the plunger pressure piece, and the pressure transmitter extends into the high pressure chamber by a transmitter piston, which is movably arranged in the main portion of the plunger, while a counter pressure piston is fixedly mounted on the transmitter piston and is guided in the low pressure chamber which communicates with the compressed-air chamber. An adjustable throttle is arranged between the two latter chambers. Due to the arrangement of the adjustable throttle, the air which is pressed into the air chamber during the damping process, is throttled back to the pressure chamber in such a manner during the upward movement of the plunger, that is, during the release of the pressure piece, that the pressure piece returns to its initial position in such a delayed manner, that it is removed from the work piece without delay at the moment when the reverse stroke of the plunger is performed. On account of the inventive utilization of the adjustable throttle, the compressed air pressure chamber may be formed, for example, by a container, since it is possible that the desired operating pressure of the press is adjusted by the throttle. However, it is even more advantageous to connect the low pressure chamber, instead of using a container, directly to a pressure source, for instance, to a pneumatic conduit. In the latter case a change of the gas volume, due to leaking, is eliminated and the effective distance of the counter pressure piston is not impaired should leaks develop.

In this connection, it should be mentioned that the throttle may be advantageously used, also for adjusting the operating pressure in another press construction, so far a pressure transmitter is employed, and even if the latter is arranged independently from the plunger.

With respect to the specific construction of the plunger it is suggested to select the pressure face of the transmitter piston substantially smaller than the pressure face of the pressure piece, and that of the counter pressure piston. By this measure, the counter pressure in the gas cylinder which is required for the delayed action of the pressure piece is even more reduced since now the transmitter piston travels a far greater distance, while the pressure piece performs only a relatively small amount. Thereby, a pressure reduction is provided which permits to stop the transmitter piston with pressure which is merely a fraction of the specific pressure.

In this connection, an advantageous construction is achieved when the counter pressure piston which is guided in the low pressure chamber, is formed as a simple plate which then centrally carries the transmitter piston. The low construction height, according to the invention, is enhanced despite the serially arranged plunger elements, which arrangement is intimately related to the functioning of the plunger dampening, in that the pressure piece comprises a central recess at the side thereof which is in communication with the liquid, into which recess the transmitter piston enters. This recess is to be dimensioned in such a way that the end portion, that is, the front face of the transmitter piston which enters hereinto, may also be effected by the liquid.

In this connection it is conceivable to arrange the central recess for receiving the piston in such a way, that it is adapted to receive the cushion. However, it is even more advantageous to provide an annular space around the transmitter piston, between the pressure piece and a stationary transverse member of the main portion of the plunger, so that the cross section of the annular space should correspond to the maximum cross section of the pressure piece and should be filled with liquid. A ring shoulder may be formed at the wall of this annular space, so that the transverse member also forms the final stop for the pressure piece. In order to balance any eventual loss of the cushion liquid, due to leaking, it is advantageous to connect the space, receiving the liquid, with an outside pressure source by means of a relief valve. Such a measure secures a constant liquid volume in the plunger dampening, so that leaking liquid does not impair the utilization of the inventive plunger dampening, and a desired final pressure will be always attainable.

For a better understanding of the invention, its operating advantages and the specific objects attained by its use, reference should be had to the accompanying drawings and descriptive matter in which.

Figure 1:
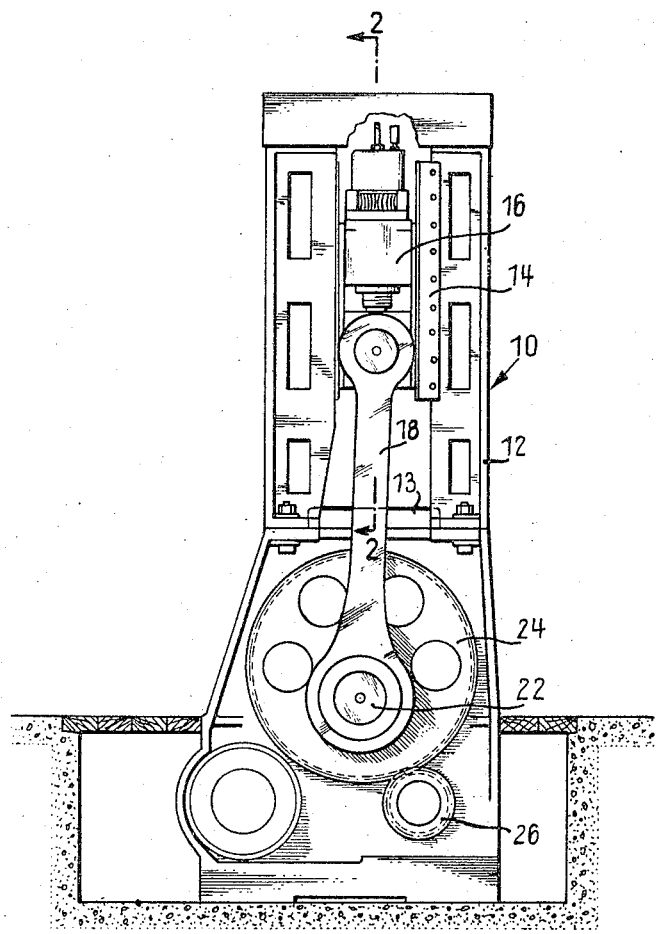
FIG. 1 is a side view of a press embodying principles of the invention.

The crank press as shown in the drawings comprises a general press frame 10 which includes side portions 12 displaced with respect to each other and a table 13.

Between portions 12, a press plunger, generally indicated by 16, is guided in guides 14 and is operated by laterally arranged pivoted driving rods 18 and 20. The driving rods are mounted for their drive on crank pins 22 of drive sprockets 24, which are driven about a driving pinion 26 by means of an electric motor (not shown). Both driving rods are arranged at either sides of table 13 on side portions 12 thereof, in such a way that a double sided crank press with a symmetrical double sided drive is provided. Drive rods 18 and 20 are secured on projections 28 and 30 of plunger body 32. For this purpose, an adjustment device for adjusting the drive rods is arranged in each projection.

Figure 2:
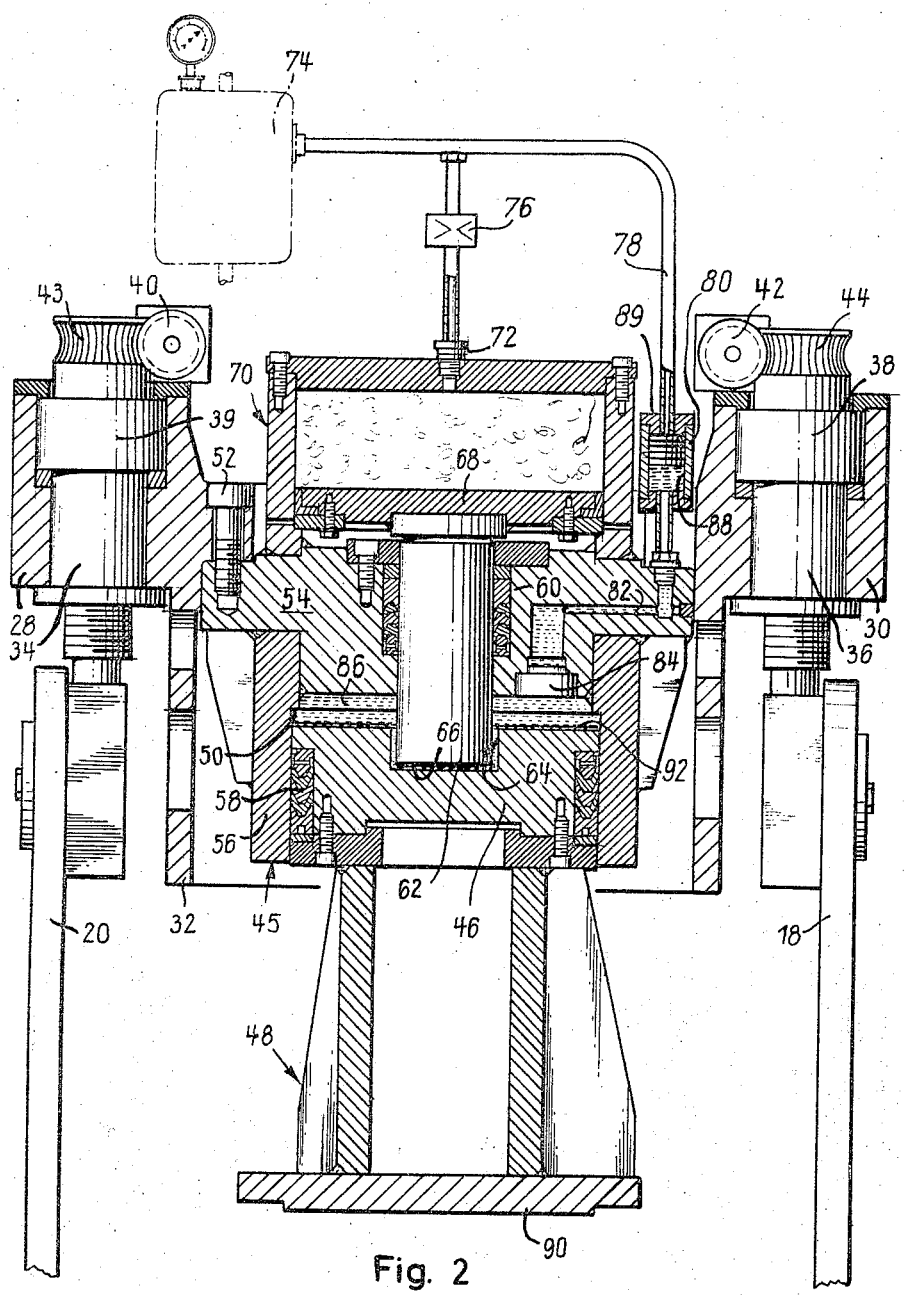
FIG. 2 is a section taken along line 2—2 through the press, according to FIG. 1, on an enlarged scale.

As can be seen from FIG. 2, adjustment pieces 34 and 36 are secured to the upper ends of both driving rods and are threaded into bushings 38 and 39. These bushings are rotatably mounted in their abutments but cannot be adjusted longitudinally therein. The rotational movement is effected by externally arranged rotatable helixes 40 and 42 which are in camming engagement with helix wheels 43 and 44, the latter being arranged on bushings 38 and 39. The plunger body of plunger 16 is partly arranged in the inside thereof, and comprises an inner main plunger portion 45 in which a pressure piece 46 is provided. The latter serves for receiving a tool generally designated 48 and is movably arranged in a predetermined distance axially within the main portion of the plunger, whereby the inner final position is defined by an inner ring shoulder 50.

The main portion of plunger 45 is formed substantially by a transverse member 54 which is secured within plunger body 32 by means of screws 52. A boss-like extension 56 for guiding pressure piece 46 which is formed as a piston, is arranged adjoining the transverse body 54, according to FIG. 2. The pressure piece is guided, pressure- and liquid tight, by means of gaskets 58, which are arranged at the circumference of the pressure piece. An axially movable transmitter piston 60 of a pressure transmitter is centrally arranged in the transverse member or center portion 54. The transmitter piston 60 is arranged with respect to its length, in such a way, that the shaft thereof pierces the center portion, while a lower end portion 62 extends into a center recess 64 of pressure piece 46. Center recess 64 is formed to receive a front face 66 of the transmitter piston. A plate like center pressure piston 68 is arranged at the upper end portion of the transmitter piston 60 and extends above the transverse member, as can be seen in FIG. 2, and is movably guided in a gas cylinder 70 which is mounted on the transverse member. A conduit 72 is leading from the gas cylinder to a gas tank 74 which is indicated by a dash-dot line in FIG. 2. An adjustable throttle 76 is interposed in conduit 72. A branch conduit 78, leads from this conduit to a pressure cylinder 80, which is connected to a channel 82 provided in the transverse member 54. Channel 82 discharges by means of a relief valve 84, into a high pressure chamber 86 which is formed by pressure piece 46, transverse member 54 and the pressure transmitter, or transmitter piston 60, respectively. The high pressure chamber, and therefore the central recess 64 of pressure piece 46 are filled with liquid, preferably with hydraulic oil. Similarly, channel 82 of the transverse member, as well as a cylinder chamber 88 and a movably arranged piston 89 of pressure cylinder 80 which are in contact with channel 82, are also filled with hydraulic oil.

The mode of operation of the above described device is as follows:

In the normal position of the device, the pressure piece is in the position shown in FIG. 2 in which it is retained by means (not shown). Gas will be passed at a predetermined pressure from tank 74 through conduit 72 and into the low pressure chamber 70 of the pressure transmitter which pressure is effective on counter pressure piston 68. Thereby, the gas is holding the pressure piece in the shown position.

When pressure is exerted to front face 90 of tool 48 during the pressing operation, the pressure piece will be moved upwardly against the liquid pressure at a predetermined pressure relatively with respect to pressure body 32 or transverse member 54, so that the liquid which is present in high pressure chamber 86 will be displaced and will be pressed into the central recess 64 of pressure piece 46.

Due to the fact that the pressure face of the transmitter piston 60 is substantially smaller than the pressure face of the pressure piece, the transmitter piston will therefore be moved upwardly at a speed which is much larger in comparison to the speed at which the pressure piece moves, whereby the gas which is present in the gas cylinder or lower pressure chamber, respectively, will be compressed by means of counter pressure piston 68 and the required counter pressure for dampening of the pressure piece will be produced. As soon as the pressure piece engages the inner ring 50 of boss 56 with its associated annular front face 92, it will be directly carried along by plunger body 32 or by the transverse member respectively.

When the plunger performs the return stroke, the remaining compressed gas in cylinder 70 is relaxed and the pressure piece returns to the position shown in FIG. 2 at a speed which enables an instant lifting of the plunger from the work piece during the return stroke thereof, due to the throttle gas which flows into the cylinder.

It should be understood, of course, that the foregoing disclosure relates only to a preferred embodiment of the invention and it is intended to cover all changes and modifications of the example described which do not constitute departures from the spirit and scope of the invention as set forth in the appended claims.

What is claimed is:

1. In a mechanical press, plunger means comprising a body portion, pressure transmitting means defining a high pressure chamber with said body portion for cushioning movement of said plunger means to and from a work piece, a transmitting piston member extending with one end thereof into said high pressure chamber, a low pressure chamber, piston means for said low pressure chamber fixedly secured to the other end of said transmitting piston member for movement therewith against a fluid in said low pressure chamber, means connecting said low pressure chamber to a source of pressurized fluid for supplying said fluid to said low pressure chamber, and a control valve for controlling movement of said fluid to and from said low pressure chamber.

2. The combination as claimed in claim 1, wherein said source of pressure fed fluid comprises a container secured to said plunger means.

3. The combination as claimed in claim 1, wherein said pressure transmitting means comprises a face portion in engagement with the fluid in said high pressure chamber, said piston means comprises a face portion in engagement with the low pressure fluid, said transmitting piston member having a face portion in engagement with the fluid in said high pressure chamber, the face portion of said transmitting piston member being substantially smaller than the said face portions of said pressure transmitting means and said piston means.

4. The combination as claimed in claim 3, wherein a recess is formed in said pressure transmitting means at the face thereof in engagement with the fluid in said high pressure chamber, said transmitting piston being adapted to enter into the fluid in said recess.

5. The combination as claimed in claim 1, wherein said body portion of said plunger means is stationary relative to the movement of said pressure transmitting means and said transmitting piston member, said body portion at the side thereof defining said high pressure chamber with said pressure transmitting means surrounding said piston member and defining therewith an annular chamber portion of said high pressure chamber, the cross sectional areas of said annular chamber portion corresponding substantially to the face portion of said pressure transmitting means in engagement with the fluid in said high pressure chamber.

6. The combination as claimed in claim 1, further comprising boss means secured to said body portion for receiving said pressure transmitting means in slidable engagement therein, said boss means comprising a shoulder portion disposed in said high pressure chamber for defining an upper position for said pressure transmitting means.

7. The combination as claimed in claim 6, wherein said pressure transmitting means is formed as a piston in fluid tight engagement with said boss means.

8. The combination as claimed in claim 1, wherein said piston means is formed as a plate, said transmitting piston member being centrally coupled thereto.

9. The combination as claimed in claim 1, wherein said high pressure chamber communicates with a cylinder through a relief valve, said cylinder having a piston arranged therein defining a low pressure section and a high pressure section in said cylinder, the low pressure section being in communication with said source of pressurized fluid.

References Cited

UNITED STATES PATENTS

| | | | |
|---|---|---|---|
| 1,054,194 | 2/1913 | Gerdau | 100—269 |
| 2,128,152 | 8/1938 | MacMillin | 100—269 |

FOREIGN PATENTS

| | | |
|---|---|---|
| 409,075 | 1/1925 | Germany. |

BILLY J. WILHITE, *Primary Examiner.*